(12) United States Patent
Shih et al.

(10) Patent No.: US 10,986,707 B2
(45) Date of Patent: Apr. 20, 2021

(54) DISPLAY DEVICE

(71) Applicant: InnoLux Corporation, Miao-Li County (TW)

(72) Inventors: Ming-Chia Shih, Miao-Li County (TW); Li-Wei Mao, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 262 days.

(21) Appl. No.: 16/034,871

(22) Filed: Jul. 13, 2018

(65) Prior Publication Data

US 2019/0053342 A1 Feb. 14, 2019

Related U.S. Application Data

(60) Provisional application No. 62/542,873, filed on Aug. 9, 2017.

(30) Foreign Application Priority Data

Feb. 9, 2018 (CN) .......................... 201810132735.8

(51) Int. Cl.
*H05B 33/08* (2020.01)
*G02F 1/1335* (2006.01)
*H05B 45/10* (2020.01)
*G02F 1/13357* (2006.01)
*H05B 45/37* (2020.01)

(52) U.S. Cl.
CPC ....... *H05B 45/10* (2020.01); *G02F 1/133603* (2013.01); *H05B 45/37* (2020.01); *G02F 2001/133601* (2013.01); *G02F 2001/133612* (2013.01); *G02F 2001/133614* (2013.01); *G09G 2320/064* (2013.01)

(58) Field of Classification Search
None
See application file for complete search history.

(56) References Cited

U.S. PATENT DOCUMENTS

| 2012/0019160 A1* | 1/2012 | Lee ........................ H05B 45/10 315/291 |
| 2015/0116379 A1* | 4/2015 | Lim ...................... G09G 3/3648 345/691 |
| 2016/0117997 A1* | 4/2016 | Matsui ................. G09G 3/3406 345/691 |
| 2016/0117999 A1* | 4/2016 | Hayashi ............... G09G 3/3406 345/691 |

FOREIGN PATENT DOCUMENTS

CN 103415109 A 11/2013

* cited by examiner

*Primary Examiner* — Krishna P Neupane
(74) *Attorney, Agent, or Firm* — Muncy, Geissler, Olds & Lowe, P.C.

(57) ABSTRACT

A display device includes: a display panel having a light-tuning array; a backlight module providing a backlight to the light-tuning array; and a backlight driving module electrically connected with the backlight module. The backlight driving module has a first driving mode corresponding to a first range of brightness scale and a second driving mode corresponding to a second range of brightness scale. The first driving mode controls the brightness scale corresponding to the backlight by adjusting a duty ratio of a driving signal. The second driving mode controls the brightness scale corresponding to the backlight by adjusting a current value of the driving signal.

11 Claims, 5 Drawing Sheets

DISPLAY DEVICE

CROSS REFERENCE TO RELATED APPLICATIONS

This application claims priority of U.S. Provisional Application No. 62/542,873 filed on Aug. 9, 2017 under 35 U.S.C. § 119(e), and this application claims priority of Application No. 201810132735.8 filed in China on Feb. 9, 2018 under 35 U.S.C. § 119 the entire contents of all of which are hereby incorporated by reference.

BACKGROUND

1. Field of the Disclosure

The present disclosure relates to a display device. More particularly, the present disclosure relates to a display device with a complex backlight driving.

2. Description of Related Art

Backlight drivers of display devices nowadays can be divided into pulse width modulation control or current control. The pulse width modulation control is advantageous in that the driving method is simple. However, under high driving current, this driving method suffers the drawback of low luminous efficiency. The advantage of current control is to improve the luminous efficiency, but this driving method has to be performed with a digital-to-analog converter to convert digital signal to analog signal. This will increase the cost of the circuit and cause spectral variation of the light emitting elements (e.g. light emitting diodes) of the backlight, resulting in a color shift problem. Therefore, no matter which driving method is employed, it is bound to be plagued by various problems.

In light of this situation, there is a need to develop a display device to obviate or alleviate the aforementioned problems.

SUMMARY

The present disclosure provides a display device, which has an improved design of compound backlight driver, so as to solve the aforementioned problems.

The display device of the present disclosure includes: a display panel having a light-tuning array; a backlight module providing a backlight to the light-tuning array; and a backlight driving module electrically connected with the backlight module, the backlight driving module having a first driving mode corresponding to a first range of brightness scale and a second driving mode corresponding to a second range of brightness scale. The first driving mode controls the brightness scale corresponding to the backlight by adjusting a duty ratio of a driving signal, and the second driving mode controls the brightness scale corresponding to the backlight by adjusting a current value of the driving signal.

Other objects, advantages, and novel features of the disclosure will become more apparent from the following detailed description when taken in conjunction with the accompanying drawings.

DETAILED DESCRIPTION OF THE EMBODIMENTS

The embodiments of the present disclosure will be exemplified by means of specific examples, and other advantages and objectives of the present disclosure can be easily appreciated by one skilled in the art from the content disclosed herein. The present disclosure can be embodied or applied in other different embodiments, and various modifications and variations can be made to various details in the description for different applications without departing the scope of the present disclosure.

Furthermore, the ordinal numbers recited in the specification and the claims such as "first", "second" and so on are intended only to describe the elements claimed and imply or represent neither that the claimed elements have any proceeding ordinal numbers, nor that sequence between one claimed element and another claimed element or between steps of a manufacturing method. The use of these ordinal numbers is merely to differentiate one claimed element having a certain designation from another claimed element having the same designation.

In addition, the descriptions such as "when . . . " or "during . . . " mean "at the moment, before, or after", and these descriptions are not limited to the situations that take place simultaneously. Descriptions such as "disposed on . . . " represent the relative spatial relationship between two objects, and unless specifically stated, these descriptions do not limit whether these two objects are in contact or not. Apart from that, if the term "or" is used between multiple effects (or elements) in the present disclosure when multiple effects (or elements) are recited in the present disclosure, it means each effect (or element) may exist independently, but this does not rule out that multiple effects (or elements) may exist simultaneously. Besides, the terms "electrically connected" or "coupled" recited in the present disclosure includes the meaning of direct connection and indirect connection.

Figure 1:
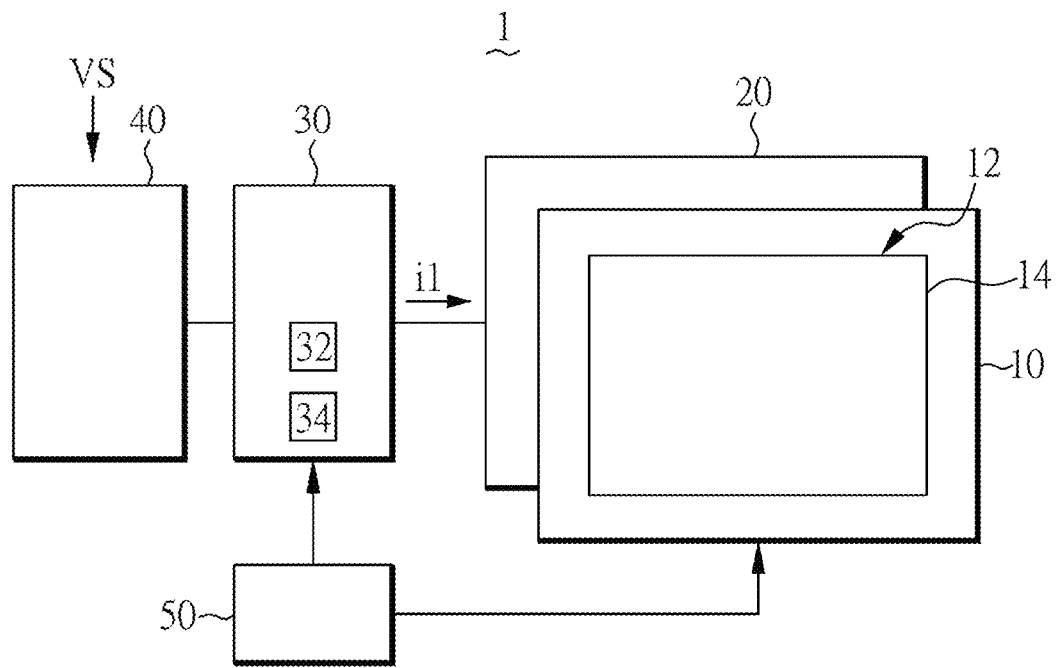
FIG. 1 is the structural schematic diagram of the display device according to one embodiment of the present disclosure.

FIG. 1 is the structural schematic diagram of the display device 1 according to one embodiment of the present disclosure. The display device 1 of the present embodiment includes: a display panel 10 and a backlight module 20. The display panel 10 has a display region 12 to display image. The display region 12 includes a plurality of pixels, and at least a portion of the pixels forms a first light-tuning array 14. In one embodiment, the first light-tuning array 14 includes all of the pixels in the display region 12. However, in another embodiment, the first light-tuning array 14 includes a portion of the pixels in the display region 12; i.e., the display region 12 may have a plurality of light-tuning arrays (not shown in FIG. 1), each of the plurality of light-tuning arrays includes a portion of the pixels, and the light-tuning arrays may not overlap with each other, but the present embodiment is not limited thereto. For the convenience of describing the present disclosure, the following example illustrates a display region 12 having a single first light-tuning array 14. The backlight module 20 is disposed on the rear surface of the display panel 10 to provide a first backlight when the first light-tuning array 14 is displaying image, and the first backlight may correspond to a brightness scale. The display device 1 may further include a backlight driving module 30, which is electrically connected with the backlight module 20 and outputs a first driving signal, denoted as i1, to control the brightness of the first backlight provided by the backlight module 20, but the present embodiment is not limited thereto. In one embodiment, the display device 1 may further include a processing module 40, which is electrically connected with the backlight driving module 30 and sends a control signal to the backlight driving module 30 according to a brightness request from the first light-tuning array 14 to display image. The backlight driving module 30 may have a first driving mode corresponding to a first range of brightness scale and a second driving mode corresponding to a second range of brightness scale. The backlight driving module 30 can be operated under the first driving mode or the second driving mode according to the brightness scale corresponding to the first backlight, and the backlight driving module 30 outputs the corresponding duty ratio and current value of the first driving signal i1 to the backlight module 20 to control the first backlight. For example, when the brightness scale corresponding to the first backlight falls within the first range of brightness scale, the backlight module 20 is driven under the first driving mode, and when the brightness scale corresponding to the first backlight falls within the second range of brightness scale, the backlight module 20 is driven under second driving mode, but the present embodiment is not limited thereto. In some embodiment, each of the aforementioned modules may be combined or disposed independently (e.g. the backlight driving module 30 may be integrated with the backlight module 20), and the number of the internal components in the display device 1 may be changed. In addition, the circuit structure of each module is not limited. In other words, any method that can achieve the aforementioned module is deemed to fall within the scope of the present disclosure. In one embodiment, the first range of brightness scale starts from the minimum brightness scale, and the second range of brightness scale ends at the maximum brightness scale. In one embodiment, the first range of brightness scale and the second range of brightness scale are continuous brightness level, but the present disclosure is not limited thereto. In one embodiment, under the first driving mode, the brightness scale corresponding to the first backlight may be controlled by adjusting the duty ratio of the first driving signal i1, whereas under the second driving mode, the brightness scale corresponding to the first backlight may be controlled by adjusting the current value of the first driving signal i1, but the present embodiment is not limited thereto. More precisely, when the brightness scale corresponding to the first backlight changes within the first range of brightness scale, the duty ratio of the first driving signal i1 corresponding to the brightness scale changes accordingly, thereby changing the corresponding actual brightness (e.g. the brightness of the first backlight sensed by human eyes, but not limited thereto). When the brightness scale corresponding to the first backlight changes within the second range of brightness scale, the current value of the first driving signal i1 corresponding to the brightness scale changes accordingly, thereby changing the corresponding actual brightness. In one embodiment, the current value of the first driving signal i1 within the first range of brightness scale may be a constant, but the present disclosure is not limited thereto. In one embodiment, the duty ratio of the first driving signal i1 within the second range of brightness scale may be a constant, but the present disclosure is not limited thereto. It is noted that a value being "constant" and "fixed" does not mean the value remains unchanged. Since the value may have a deviation or a fluctuation, it is acceptable that the value has a deviation or a fluctuation less than or equal to 10%. For example, when the current value of the first driving signal i1 is set at the constant value 10 mA, it is acceptable that the current value will be kept in a range from 9 mA to 11 mA.

Figure 2:
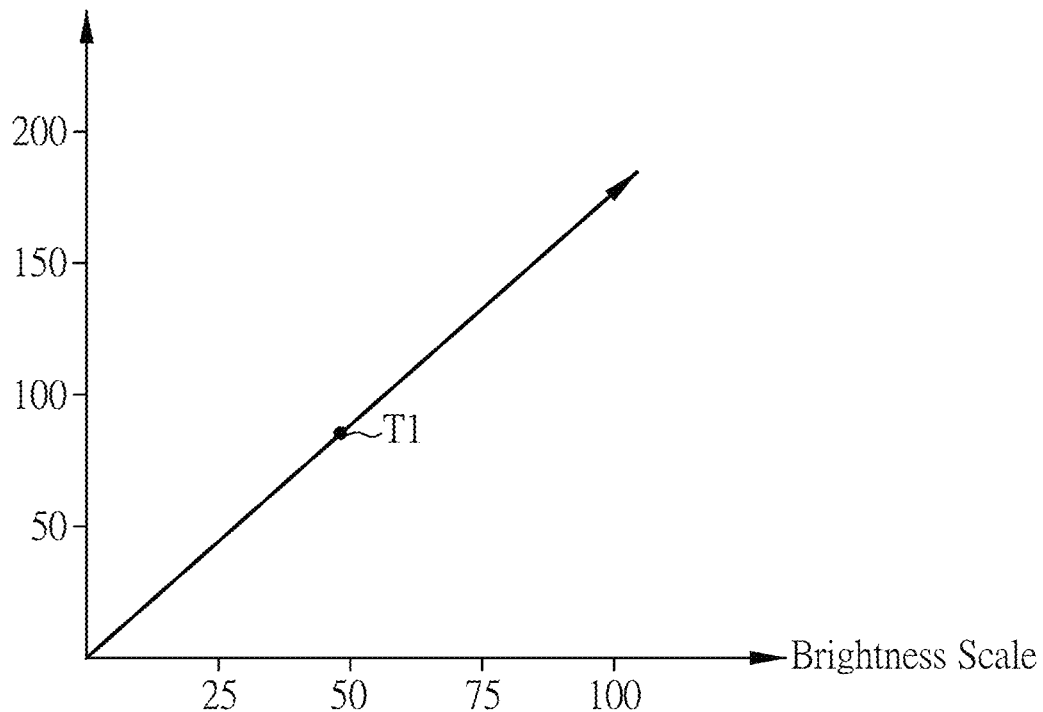
FIG. 2 is a graph showing the brightness scale of the first backlight corresponding to the actual brightness according to one embodiment of the present disclosure.

Next, the relationship between the brightness scale and the actual brightness will be depicted, and reference should be made to FIGS. 1 and 2. FIG. 2 is a graph showing the brightness scale of the first backlight corresponding to the actual brightness according to one embodiment of the present disclosure, in which the horizontal axis is the brightness scale of the display and the vertical axis is the actual brightness of the display. As shown in FIG. 2, in the present embodiment, the brightness scale ranges from 0 to 100 while the actual brightness ranges from 0 to 200 nits. It can be appreciated from the figure that the brightness scale has a linear relationship with the actual brightness; i.e., each brightness scale may correspond to one actual brightness, but the present disclosure is not limited thereto. In one embodiment, a plurality of brightness scales may correspond to one actual brightness; i.e., the brightness scale may be divided into a plurality of levels, and the actual brightness increases only when the brightness scale exceeds a level, but the present disclosure is not limited thereto. The number of the aforementioned brightness scales and actual brightness is merely illustrative instead of restrictive, and they can be altered according to the specification requirement of the display device 1 in a practical application.

In one embodiment, a brightness scale in the first range of brightness scale or in the second range of brightness scale may be set as a threshold value T1 (e.g. the brightness scale 50), where the brightness scales less than the threshold value T1 may belong to the first range of brightness scale (e.g. the first range of brightness scale includes brightness scales 0 to 49), and the brightness scales greater than the threshold value T1 may belong to the second range of brightness scale (e.g. the second range of brightness scale includes brightness scales 51 to 100). In other words, the first range of brightness scale and the second range of brightness scale may be divided by the threshold value T1, but the present disclosure is not limited thereto. In addition, the brightness scale of the threshold value T1 may belong to the first range of brightness scale or the second range of brightness scale. Alternatively, the brightness scale of the threshold value T1 (e.g. brightness scale 50) equals to the maximum brightness scale within the first range of brightness scale and also equals to the minimum brightness scale within the second range of brightness scale, and the present disclosure does not limit the definition of the threshold value T1. In particular, since the first range of brightness scale may correspond to lower brightness whereas the second range of brightness scale may correspond to higher brightness, the brightness scale within the first range of brightness scale may be less than or equal to the brightness scale within the second range of brightness scale, but the present disclosure is not limited thereto.

In one embodiment, each brightness scale within the first range of brightness scale may correspond to one duty ratio of the first driving signal i1 (i.e. when the brightness scale changes, the duty ratio also changes accordingly), while each brightness scale within the first range of brightness scale may correspond to the same current value of the first driving signal i1, but the present disclosure is not limited thereto. In one embodiment, each brightness scale within the second range of brightness scale may correspond to one current value of the first driving signal i1 (i.e. when the brightness scale changes, the current value also changes accordingly), while each brightness scale within the second range of brightness scale may correspond to the same duty ratio of the first driving signal i1, but the present disclosure is not limited thereto. In one embodiment, the duty ratio of the first driving signal i1 that corresponds to the maximum brightness scale in the first range of brightness scale may be equal to the duty ratio of the first driving signal i1 that corresponds to each brightness scale within the second range of brightness scale, but the present disclosure is not limited thereto. In one embodiment, the current value of the first driving signal i1 that corresponds to the minimum brightness scale in the second range of brightness scale may be equal to the current value of the first driving signal i1 that corresponds to each brightness scale within the first range of brightness scale, but the present disclosure is not limited thereto. Further details regarding the first range of brightness scale or the second range of brightness scale will be given in subsequent paragraphs.

In one embodiment, the display panel 10 has a display region 12 and a non-display region, but the present disclosure is not limited thereto. The display panel 10 may be in the shape of a square, rectangle, circle or any other shape, while the shape of the display region 12 may be a square, rectangle, circle or any other shape. The shapes of the display panel 10 and the display region 12 are not necessarily the same. In one embodiment, pixels in the display region 12 include switches (not shown in the figure) to control the pixels. In one embodiment, the switch (e.g. a thin film transistor) includes a gate, a source and a drain, but the present disclosure is not limited thereto. In one embodiment, the gate of the switch of the pixel may be connected with a scan line, but the present disclosure is not limited thereto. In one embodiment, the source or drain of the switch of one of the pixels may be connected with the data line, and the other terminal of the switch may be electrically connected with the pixel electrode (not shown in the figure) of the pixel, but the present disclosure is not limited thereto. In other embodiments, the gates of part of switches of the pixels on the same row may be connected with different scan lines, or the sources or drains of part of switches of the pixels on the same column may be connected with different data lines, but the present disclosure is not limited thereto. In one embodiment, the display region 12 only has the first light-tuning array 14, and therefore the amount of pixels in the display region 12 is equal to the amount of pixels in the first light-tuning array 14. In another embodiment, the display region 12 may be divided into a plurality of light-tuning arrays; i.e., the display region 12 may be divided into a plurality of zones, and the backlight module 20 provides different backlights to different zones. In one embodiment, when the display region 12 is equivalent to the first light-tuning array 14, the backlight module 20 provides a first backlight, thereby allowing the entire display region 12 to display the same brightness. In one embodiment, when the display region 12 is divided into a plurality of light-tuning arrays, the backlight module 20 provides backlight with different brightness to meet the requirements of different light-tuning arrays, but the present disclosure is not limited thereto. In one embodiment, different backlight may be controlled by different driving signals, but the present disclosure is not limited thereto.

In one embodiment, the backlight module 20 may include light emitting diodes (LEDs), micro LEDs or mini LEDs, organic light-emitting diodes, quantum dots, fluorescent material, phosphorescent material, the combination thereof, or other material suitable for the backlight source, but the present disclosure is not limited thereto. In some embodiments, the size of the LED ranges from approximately 300 μm to 10 mm, the size of mini LED ranges from approximately 100 μm to 300 μm, and the size of micro LED ranges from approximately 1 μm to 100 μm, but the present disclosure is not limited thereto. In one embodiment, when the backlight module 20 includes LEDs, the LEDs may be divided into white, red, green and blue LEDs, which provide white light, red light, green light, and blue light, respectively. In another embodiment, the LEDs may be divided into red, green, and blue LEDs, and the white light is formed by mixing the light respectively emitted by the red, green, and blue LEDs, but the present disclosure is not limited thereto. In one embodiment, the backlight module 20 further includes a reflection layer, a semi-transparent film, a diffusion film, an optical selection film or a light conversion film, and the aforementioned components may be added or omitted according to the actual requirement, but the present disclosure is not limited thereto. Since the present disclosure is focused on the operation of the backlight module 20 instead of the structural improvement thereof, the structural detail regarding the backlight module 20 will be omitted. It is noteworthy that, any backlight module that is capable of achieving the operation of the present disclosure shall fall within the scope of the present disclosure.

In one embodiment, the backlight driving module 30 drives the backlight module 20 under the first driving mode or the second driving mode. In one embodiment, the backlight driving module 30 is implemented by a driver IC, driving circuit, etc., and the backlight driving module 30 is integrated with the backlight module 20, but the present disclosure is not limited thereto. In one embodiment, the backlight driving module 30 includes a pulse width modulator 32 to adjust the duty ratio of the first driving signal i1. In one embodiment, the backlight driving module 30 includes a current adjusting device 34 to adjust the current value of the first driving signal i1. In one embodiment, the pulse width modulator 32 and the current adjusting device 34 may be implemented by various means, e.g. an amplifier, a current controller, or a power conversion circuit, but the present disclosure is not limited thereto. In addition, the backlight driving module 30 may also include a digital-to-analog converter, which converts the digital signal (e.g. the brightness scale) received by the processing device 40 into the analog signal (e.g. the first driving signal i1), so as to control the backlight module 20, but the present disclosure is not limited thereto. Moreover, the backlight driving module 30 may be electrically connected with an external power source 50 to receive the power supply for the first driving signal i1, but the present disclosure is not limited thereto. The structural detail of the aforementioned backlight driving module 30 is merely illustrative instead of restrictive. Any backlight driving module that is capable of achieving the operation of the present disclosure shall fall within the scope of the present disclosure.

In one embodiment, the processing device 40 transmits a control signal (not shown in figure) to the backlight driving module 30, thereby enabling the backlight driving module 30 to adjust the current value or duty ratio of the first driving signal i1. In one embodiment, the processing device 40 is integrated with the backlight driving module 30, but the present disclosure is not limited thereto. In one embodiment, the processing device 40 receives the image data VS, which may include the backlight brightness information required when the first light-tuning array is displaying image, but the present disclosure is not limited thereto. In one embodiment, the processing device 40 obtains the target brightness of the first backlight according to the image data VS, and subsequently obtains the corresponding brightness scale of the target brightness, thereby determining whether the backlight driving module 30 should perform the first driving mode or the second driving mode, and the processing device 40 transmits the controlling signal to the backlight driving module 30 for controlling the backlight driving module 30 to adjust the first driving signal i1, but the present disclosure is not limited thereto. The processing device 40 may be implemented by a micro-control unit (MCU), a field-programmable gate array (FPGA), a digital signal processor (DSP), a processor circuit, or any other element with processing capability, but the present disclosure is not limited thereto. In one embodiment, the processing device 40 performs calculation according to an algorithm by, for example, calculating the required duty ratio or current value of the first driving signal i1 according to the image data VS, but the present disclosure is not limited thereto. Further details regarding the algorithm will be given in the subsequent paragraphs. The structural detail of the aforementioned processing device 40 is merely illustrative instead of restrictive. Any processing device that is capable of achieving the operation of the present disclosure shall fall within the scope of the present disclosure.

Figure 3A:
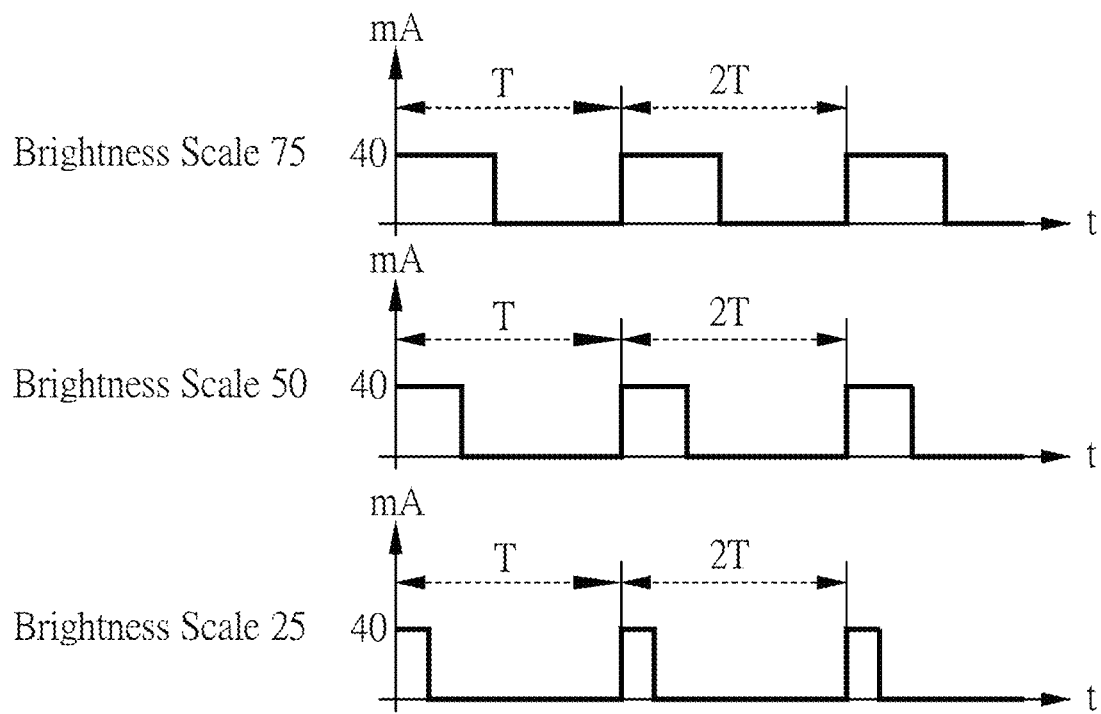
FIG. 3(A) is the schematic diagram illustrating the variation of the first driving signal within the first range of brightness scale according to one embodiment of the present disclosure.

Next, the driving method of the present disclosure will be discussed in detail, and reference should be made to FIGS. 1 to 3(B). FIG. 3(A) is the schematic diagram illustrating the variation of the first driving signal i1 within the first range of brightness scale (i.e. operation of the first driving mode) according to one embodiment of the present disclosure. As shown in FIG. 3(A), in the present embodiment, when the brightness scale is 25, the corresponding current value of the first driving signal i1 is 40 mA, whereas the corresponding duty ratio of the first driving signal i1 is 15%; when the brightness scale is adjusted to 50, the corresponding current value of the first driving signal i1 is maintained at 40 mA, whereas the corresponding duty ratio of the first driving signal i1 is adjusted to 30%; when the brightness scale is adjusted to 75, the corresponding current value of the first driving signal i1 is maintained at 40 mA, whereas the corresponding duty ratio of the first driving signal i1 is adjusted to 50%. Therefore, it can be appreciated that the adjustment of the first range of brightness scale of the first backlight relates to the duty ratio of the first driving signal i1, and the brightness scales correspond to the same current value. In other words, the brightness scale within the first range of brightness scale can be adjusted by adjusting the duty ratio of the first driving signal i1. It should be noted that the aforementioned values for the duty ratio, current value, and brightness scale are merely for illustrative purpose and they are not intended for limiting the scope of the present disclosure.

Figure 3B:
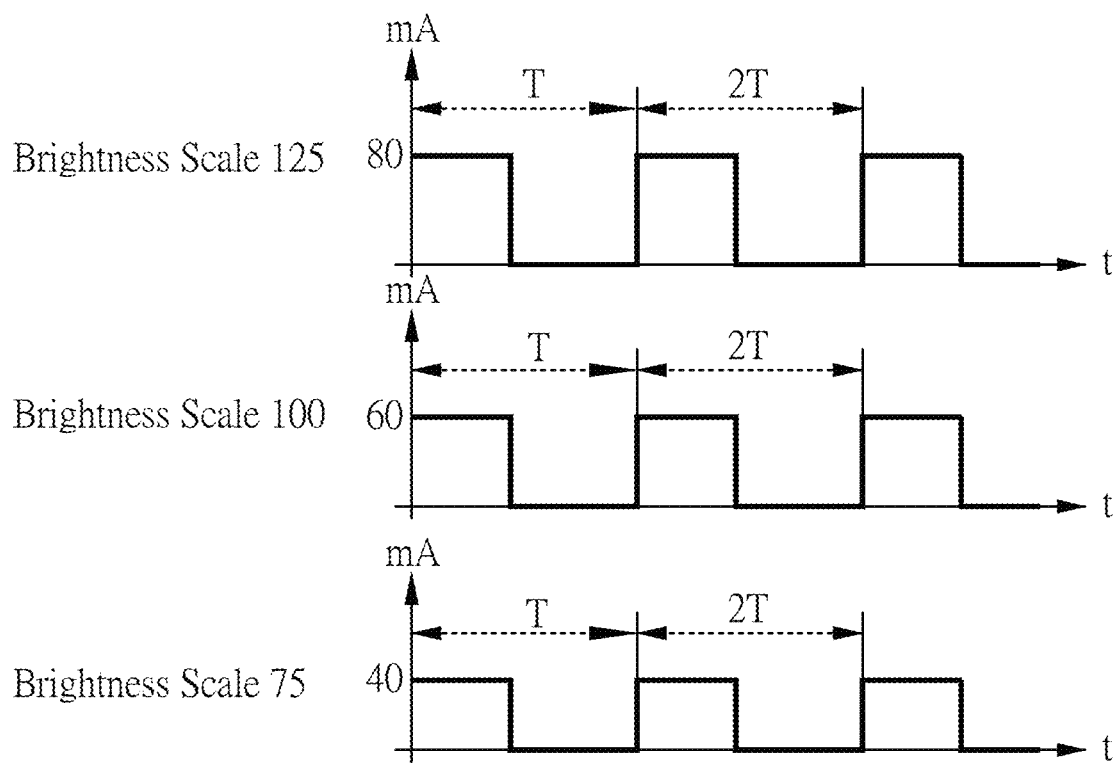
FIG. 3(B) is the schematic diagram illustrating the variation of the first driving signal within the second range of brightness scale according to one embodiment of the present disclosure.

FIG. 3(B) is the schematic diagram illustrating the variation of the first driving signal i1 within the second range of brightness scale (i.e. operation of the second driving mode) according to one embodiment of the present disclosure. As shown in FIG. 3(B), in the present embodiment, when the brightness scale is 75, the corresponding current value of the first driving signal i1 is 40 mA, whereas the corresponding duty ratio of the first driving signal i1 is 50%; when the brightness scale is adjusted to 100, the corresponding duty ratio of the first driving signal i1 is maintained at 50%, whereas the corresponding current value of the first driving signal i1 is adjusted to 60 mA; when the brightness scale is adjusted to 125, the corresponding duty ratio of the first driving signal i1 is maintained at 50%, whereas the corresponding current value of the first driving signal i1 is adjusted to 80 mA. Therefore, it can be appreciated that the adjustment of the second range of brightness scale of the first backlight relates to the current value of the first driving signal i1, and the brightness scales correspond to the same duty ratio. In other words, the brightness scale within the second range of brightness scale can be adjusted by adjusting the current value of the first driving signal i1. It should be noted that the aforementioned values for the duty ratio, current value, and brightness scale are merely for illustrative purpose and they are not intended for limiting the scope of the present disclosure.

Figure 4A:
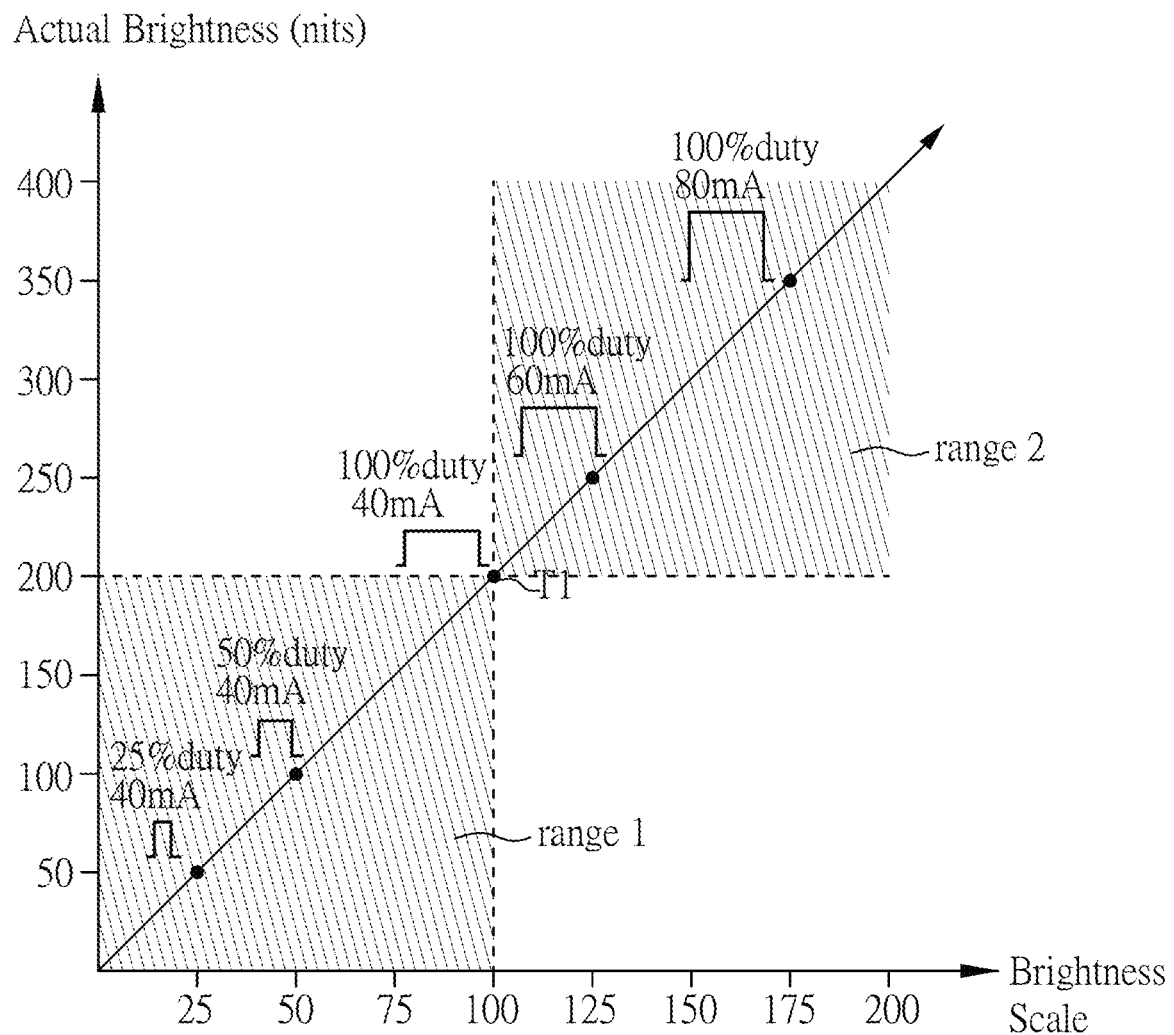
FIG. 4(A) is a graph illustrating the detailed operation of the backlight module according to one embodiment of the present disclosure.

During a practical operation, the backlight module 20 of the present disclosure has both of the first driving mode and the second driving mode, and an example will be described below (it is noted that the values used in this example are different from those used in FIGS. 3(A) and 3(B)). FIG. 4(A) is a graph illustrating the detailed operation of the backlight module 20 according to one embodiment of the present disclosure, and reference should also be made to FIGS. 1 to 3(B). The horizontal axis in FIG. 4(A) is the brightness scale while the vertical axis thereof is the actual brightness. In the present embodiment, the brightness scale ranges from 0 to 200 while the actual brightness ranges from 0 to 400 nits. It should be noted that the aforementioned brightness scale and the actual brightness are all for illustrative purpose, and the present disclosure is not limited thereto.

As shown in FIG. 4(A), in the present embodiment, the first range of brightness scale (range 1) of the first backlight includes brightness scales 0 to 100; the second range of brightness scale (range 2) of the first backlight includes brightness scales 100 to 200. In other words, the first range of brightness scale (range 1) corresponds to smaller brightness scales while the second range of brightness scale (range 2) corresponds to larger brightness scales. Brightness scale 100 is the threshold value T1. The threshold value T1 is deemed as the border between the first range of brightness scale (range 1) and the second range of brightness scale (range 2), and threshold value T1 is also deemed as the maximum brightness scale in the first range of brightness scale (range 1) and the minimum brightness scale in the second range of brightness scale (range 2). In some examples, a first brightness scale in the first range of brightness scale (range 1) may be less than a second brightness scale in the second range of brightness scale (range 2). In other examples, a first brightness scale in the first range of brightness scale (range 1) is equal to a second brightness scale in the second range of brightness scale (range 2).

In one embodiment, when the brightness scale is adjusted within the first range of brightness scale (range 1), for example, from brightness scale 25 to brightness scale 50, the current value of the first driving signal i1 remains unchanged (e.g. 40 mA), while the duty ratio increases from 25% to 50%, and the actual brightness increases from 50 nits to 100 nits, but the present disclosure is not limited thereto. In one embodiment, when the brightness scale is adjusted within the second range of brightness scale (range 2), for example, from brightness scale 125 to brightness scale 175, the duty ratio of the first driving signal i1 remains unchanged (e.g. 100%) while the current value increases from 60 mA to 80 mA, and the actual brightness increases from 250 nits to 350 nits, but the present disclosure is not limited thereto.

In one embodiment, the maximum brightness scale (e.g. the brightness scale of the threshold value T1) in the first range of brightness scale (range 1) corresponds to the maximum duty ratio (e.g. 100%) of the first driving signal i1, and therefore, when the brightness scale is adjusted from the first range of brightness scale (range 1) to the second range of brightness scale (range 2), the duty ratio of the first driving signal i1 remains as the duty ratio of the threshold value T1, but the present disclosure is not limited thereto. Furthermore, in one embodiment, the minimum brightness scale (e.g. the brightness scale of the threshold value T1) in the second range of brightness scale (range 2) corresponds to the minimum current value (e.g. 40 mA) of the first driving signal i1, and therefore, when the brightness scale is adjusted from the second range of brightness scale (range 2) to the first range of brightness scale (range 1), the current value of the first driving signal i1 remains as the current value of the threshold value T1, but the present disclosure is not limited thereto. It is noted that, although the maximum duty ratio of the present embodiment is 100%, the maximum duty ratio in other embodiments may be less than 100%. In addition, the minimum current value is not restricted to 40 mA. The brightness value and the actual brightness are all for illustrative purpose, and the present disclosure is not limited thereto.

Figure 4B:
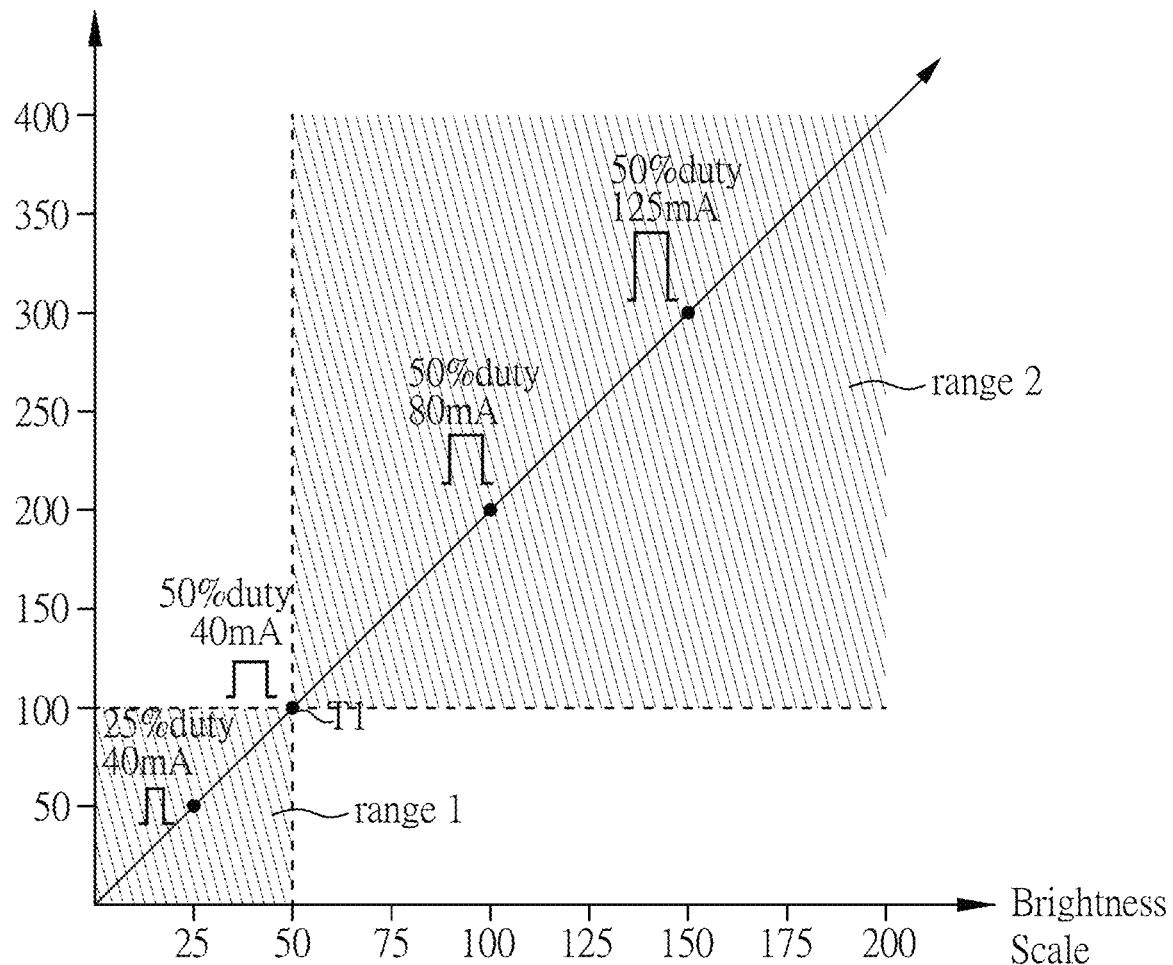
FIG. 4(B) is a graph illustrating the detailed operation of the backlight module according to another embodiment of the present disclosure.

Although the first range of brightness scale (range 1) and the second range of brightness scale (range 2) in the embodiment for FIG. 4(A) have the same amount of brightness scales, in other embodiments, the first range of brightness scale (range 1) and the second range of brightness scale (range 2) may have different amount of brightness scales. In other words, the first range of brightness scale (range 1) and the second range of brightness scale (range 2) may have different brightness levels. FIG. 4(B) is a graph illustrating the detailed operation of the backlight module 20 according to another embodiment of the present disclosure, and reference should also be made to FIGS. 1 to 4(A). The horizontal axis in FIG. 4(B) is the brightness scale while the vertical axis thereof is the actual brightness. As shown in FIG. 4(B), in the present embodiment, the first range of brightness scale (range 1) includes brightness scales 0 to 50; the second range of brightness scale (range 2) includes brightness scales 50 to 200. In other words, the threshold value T1 is the brightness scale 50, and the first range of brightness scale (range 1) and the second range of brightness scale (range 2) may have different amount of brightness scales, but the present disclosure is not limited thereto. In the present embodiment, the first range of brightness scale (range 1) corresponds to the first driving mode, i.e. the brightness scale within the first range of brightness scale (range 1) is achieved by adjusting the duty ratio of the first driving signal i1; the second range of brightness scale (range 2) corresponds to the second driving mode, i.e. the brightness scale within the second range of brightness scale (range 2) is achieved by adjusting the current value of the first driving signal i1, but the present disclosure is not limited thereto. It is noted that, although the amount of brightness scales in the first range of brightness scale (range 1) is less than that in the second range of brightness scale (range 2), in other embodiments, the amount of brightness scales in the first range of brightness scale (range 1) may be equal to or greater than the amount of brightness scales in the second range of brightness scale (range 2).

Therefore, the backlight control of the present disclosure is provided with two driving modes. For low brightness, the backlight brightness is adjusted by adjusting the duty ratio of the driving signal, and for high brightness, the backlight brightness is adjusted by adjusting the current value of the driving signal. By using the first driving mode (pulse width modulation) for low brightness, the driving process can be simplified. In addition, since the current value is maintained at constant value, the color shift due to the current fluctuation of the light emitting elements (e.g. light emitting diodes) can be mitigated. Apart from that, the present disclosure may switch the first driving mode to the second driving mode for high brightness, and this mitigates the problem of low luminous efficiency of pulse width modulation with high driving current. In addition, by adopting the second driving mode (driving current control) for high brightness, the luminous efficiency can be improved, and since driving current control is only employed for high brightness, the color shift due to driving current fluctuation of the light emitting elements can be reduced.

The first and second driving modes of the present disclosure may be achieved by various means. For instance, in one embodiment, the processing device 40 executes an algorithm to calculate the required duty ratio or current value of the first driving signal that corresponds to the target brightness i1 according to the image data VS, and the backlight driving module 30 adjusts the first driving signal i1 according to the calculation results, thereby enabling the first backlight provided by the backlight module 20 to reach the target brightness, but the present disclosure is not limited thereto. In one embodiment, the image data VS includes the target brightness or the brightness scale of the first backlight (if the image data VS only contains the data of the target brightness, the processing device 40 acquires the brightness scale corresponding to the target brightness by various means, for instance, but not limited to, finding the brightness scale through a default reference table). Then, the brightness scale is compared with the threshold value to determine whether the backlight driving module 30 should operate under first driving mode or second driving mode, but the present disclosure is not limited thereto. In one embodiment, the processing device 40 calculates the required current value or duty ratio of the first driving signal corresponding to the target brightness. In one embodiment, the algorithm may be compiled using various programming languages, as long as the processing device 40 can calculate the required current value or duty ratio of the first driving signal i1 corresponding to the target brightness.

In one embodiment, when the target brightness of the first backlight is less than or equal to the threshold value, the current value of the first driving signal i1 remains as a minimum current value (i.e. the corresponding minimum current value of the first driving signal i1 within the second range of brightness scale), and the duty ratio of the first driving signal i1 corresponding to the target brightness satisfies the following equation:

$$P'=k*P/(\text{switch}),$$

where P' is the duty ratio corresponding to the target brightness, k is the brightness scale corresponding to the target brightness, switch is the brightness scale of the threshold value (i.e. the maximum brightness scale in the first range of brightness scale), and P is a maximum duty ratio of the driving signal that corresponds to the first range of brightness scale.

In one embodiment, when the target brightness of the first backlight is greater than the threshold value, the duty ratio of the first driving signal i1 remains as a maximum duty ratio (i.e. the corresponding maximum duty ratio of the first driving signal i1 in the first range of brightness scale), and the first driving signal i1 corresponds to a required current value i', which satisfies the following equation:

$$i'=k*i/(\text{switch}),$$

where i' is the current value corresponding to the target brightness, k is a brightness scale corresponding to the target brightness, switch is the brightness scale of the threshold value (i.e. the minimum brightness scale in the second range of brightness scale), and i is a maximum current value of the driving signal that corresponds to the second range of brightness scale.

The aforementioned equations are merely illustrative instead of restrictive. For example, when the target brightness of the first backlight equals to the threshold value, the duty ratio can be treated as constant to calculate the current value. Besides, although the first driving signal i1 corresponds to the same current value in the first range of brightness scale in the aforementioned embodiment, in another embodiment, the brightness scale may correspond to different current values in the first range of brightness scale, as long as the current value corresponding to the maximum brightness scale (i.e. the threshold value T1) of the first range of brightness scale equals to the minimum current value corresponding to the second range of brightness scale, but the present disclosure is not limited thereto. Besides, although the first driving signal i1 corresponds to the same duty ratio in the second range of brightness scale in the aforementioned embodiment, in another embodiment, the brightness scale may correspond to different duty ratios in the second range of brightness scale, as long as the duty ratio corresponding to the minimum brightness scale (i.e. the threshold value T1) of the second range of brightness scale equals to the maximum duty ratio corresponding to the first range of brightness scale, but the present disclosure is not limited thereto.

In addition, in the present embodiment, the backlight module 20 provides the same brightness to the entire first light-tuning array 14; i.e., the entire first light-tuning array 14 is driven by the same current and duty ratio, but the present disclosure is not limited thereto. Apart from that, in one embodiment, when the white light of the backlight module 20 is formed by the mixture of the RGB lights, the processing device 40 determines the respective brightness of the red, green, and blue lights according to the default color saturation of the white light. For instance, the red, green, and blue lights may have different maximum duty ratios P, and according to the aforementioned algorithm, the duty ratio P' corresponding to the target brightness of the red, green, and blue lights may be calculated, but the present disclosure is not limited thereto.

While the aforementioned embodiment is illustrated using the display region 12 with only the first light-tuning array 14, in other embodiments, the display region 12 may be divided into a plurality of light-tuning arrays, and the backlight module 20 provides different backlights to different light-tuning arrays. In other words, the backlight module 20 corresponds to different driving modes for different light-tuning arrays, but the present disclosure is not limited thereto. Hereinafter, the aspect of the present disclosure with a plurality of light-tuning arrays will be discussed, and reference should be made to FIGS. 1 to 5.

Figure 5:
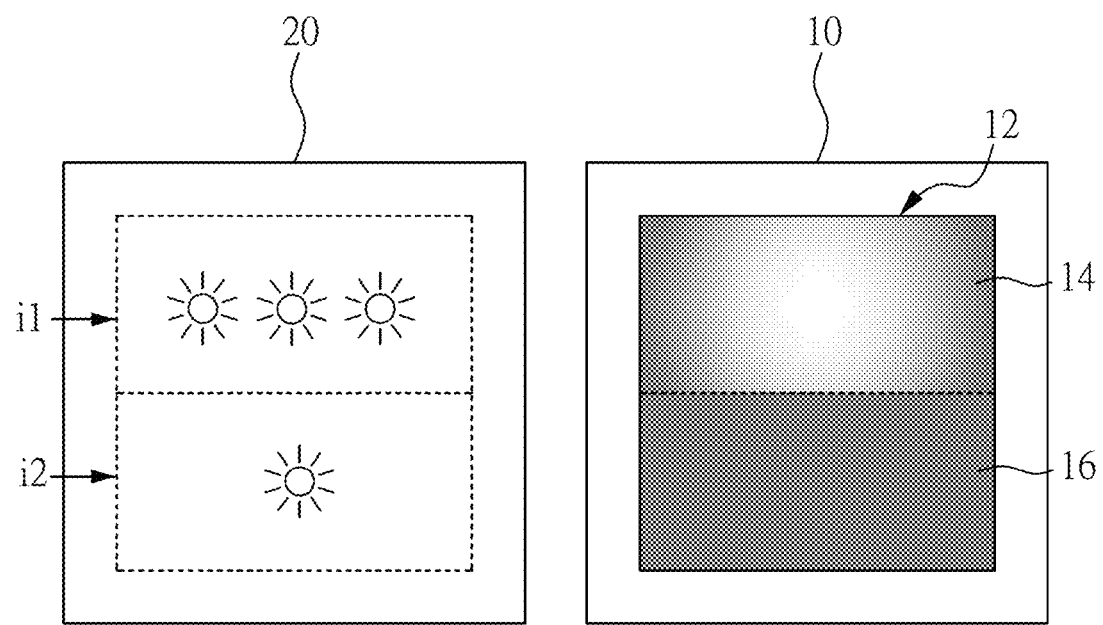
FIG. 5 is the structural schematic diagram of the display panel and backlight module according to another embodiment of the present disclosure.

FIG. 5 is the structural schematic diagram of the display panel 10 and backlight module 20 according to another embodiment of the present disclosure, reference should again be made to FIG. 1. In the present embodiment, the display device 1, backlight driving module 30, and processing device 40 adopt the architecture of FIG. 1. Therefore, only display panel 10 and backlight module 20 are shown, and details regarding the backlight driving module 30 and the processing device 40 are omitted since they are similar to the elements with equivalent numerals in FIG. 1. In addition to the first light-tuning array 14, the display region 12 of the display panel 10 in accordance with the present embodiment further includes a second light-tuning array 16. In other words, the display region 12 of the present embodiment may at least be divided into the first light-tuning array 14 and second light-tuning array 16. It is noted that, in other embodiments, the display region 12 may be divided to more light-tuning arrays.

In the present embodiment, the backlight module 20 provides a first backlight to the first light-tuning array 14 and a second backlight to the second light-tuning array 16, so as to perform partial light-tuning to the display region 12. In one embodiment, the first backlight corresponding to the first light-tuning array 14 may be controlled by the first driving signal i1 while the second backlight corresponding to the second light-tuning array 16 may be controlled by the second driving signal i2, but the present embodiment is not limited thereto. The first backlight and the first driving signal i1 have already been discussed in the previous embodiments, and thus the descriptions herein will focus on the second backlight and the second driving signal i2. In one embodiment, the second backlight has a third range of brightness scale and a fourth range of brightness scale, but the present embodiment is not limited thereto. In one embodiment, the third range of brightness scale corresponds to the third driving mode. Similar to the first driving mode, the current value of the second driving signal i2 may be fixed in the third driving mode, and the brightness scale within the third range of brightness scale is adjusted by using the duty ratio of the second driving signal i2, but the present disclosure is not limited thereto. Furthermore, the fourth range of brightness scale corresponds to the fourth driving mode. Similar to the second driving mode, the duty ratio of the second driving signal i2 may be fixed in the fourth driving mode, and the brightness scale within the fourth range of brightness scale is adjusted by using the current value of the second driving signal i2, but the present disclosure is not limited thereto. In one embodiment, the threshold value T1 between the first range of brightness scale and the second range of brightness scale is defined as the first threshold value, and the threshold value between the third range of brightness scale and the fourth range of brightness scale is defined as the second threshold value. The first and the second threshold values may be the same brightness scale, but in another embodiment, the first and the second threshold values may be different brightness scales, and the present disclosure is not limited thereto. In one embodiment, the first range of brightness scale and the third range of brightness scale may be the same, but the present disclosure is not limited thereto. In one embodiment, the second range of brightness scale and the fourth range of brightness scale may be the same, but the present disclosure is not limited thereto. In one embodiment, the backlight driving module 30 and the processing device 40 control the second driving signal i2 by using the same control method for the first driving signal i1

(e.g. the same algorithm), and the backlight driving module 30 and the processing device 40 controls the first driving signal i1 and the second driving signal i2 individually. In other words, the control method for the first driving signal i1 in the aforementioned embodiments is applicable to the second driving signal i2, but the present disclosure is not limited thereto. Therefore, the present disclosure is applicable to the display device with local light-tuning technology.

In the present disclosure, the display device 1 in the previous embodiments may be integrated with a touch panel to form a touch display device. In addition, the display device or the touch display device of the aforementioned embodiments of the present disclosure is applicable to any known electronic device requiring display screen in the related art, e.g. display device, mobile phone, notebook, tablet, watch, VR display, video recorder, camera, music player, navigation device, television, automobile dashboard, center console, electronic rear view mirror, or head-up display.

Hence, the display panel of the present disclosure may provide a plurality of backlight driving modes according to the brightness requirement. For low brightness, the present disclosure may adjust the duty ratio of the driving signal to control the brightness while maintaining the current value at a constant level. Thus, a simple driving mechanism can be achieved to not only mitigate the color shift due to the current fluctuation of the light emitting elements (e.g. light emitting diodes), but also improve luminous efficiency for low brightness. Alternatively, the present disclosure may adjust the current value of the driving signal to control the brightness while maintaining the duty ratio at a constant level, so as to improve the luminous efficiency for high brightness.

Although the present disclosure has been explained in relation to its preferred embodiment, it is understood that many other possible modifications and variations can be made without departing from the spirit and scope of the invention as hereinafter claimed.

What is claimed is:

1. A display device, comprising:
a display panel having a first light-tuning array and a second light-tuning array;
a backlight module providing a first backlight to the first light-tuning array and providing a second backlight to the second light-tuning array; and
a backlight driving module electrically connected with the backlight module, the backlight driving module having a first driving mode corresponding to a first range of brightness scale, a second driving mode corresponding to a second range of brightness scale, a third driving mode corresponding to a third range of brightness scale and a fourth driving mode corresponding to a fourth range of brightness scale;
wherein the first driving mode controls a brightness scale corresponding to the first backlight by adjusting a duty ratio of a first driving signal, and the second driving mode controls the brightness scale corresponding to the first backlight by adjusting a current value of the first driving signal;
wherein the third driving mode controls an another brightness scale corresponding to the second backlight by adjusting a duty ratio of a second driving signal, and the fourth driving mode controls the another brightness scale corresponding to the second backlight by adjusting a current value of the second driving signal;
wherein the backlight driving module controls the first driving signal and the second driving signal individually;
wherein a maximum brightness scale in the first range of brightness scale is equal to a minimum brightness scale in the second range of brightness scale, and a maximum brightness scale in the third range of brightness scale is equal to a minimum brightness scale in the fourth range of brightness scale;
wherein the maximum brightness scale in the first range of brightness scale is different from the maximum brightness scale in the third range of brightness scale.

2. The display device of claim 1, wherein the first driving signal has a constant current value corresponding to the first range of brightness scale.

3. The display device of claim 1, wherein the first driving signal has a constant duty ratio corresponding to the second range of brightness scale.

4. The display device of claim 3, wherein the first driving signal has a maximum duty ratio corresponding to the first range of brightness scale.

5. The display device of claim 4, wherein the maximum duty ratio equals to the constant duty ratio.

6. The display device of claim 3, wherein the first driving signal has a minimum current value corresponding to the second range of brightness scale.

7. The display device of claim 6, wherein the minimum current value equals to the constant current value.

8. The display device of claim 1, wherein when a target brightness of the first backlight corresponds to the first range of brightness scale, the duty ratio of the first driving signal satisfies the following equation:

$$P'=k*P/(\text{switch}),$$

where P' is the duty ratio corresponding to the target brightness, k is a brightness scale corresponding to the target brightness, switch is a maximum brightness scale in the first range of brightness scale, and P is a maximum duty ratio of the first driving signal corresponding to the first range of brightness scale.

9. The display device of claim 1, wherein when a target brightness of the first backlight corresponds to the second range of brightness scale, the current value of the first driving signal satisfies the following equation:

$$i'=k*i/(\text{switch});$$

wherein i' is the current value corresponding to the target brightness, k is a brightness scale corresponding to the target brightness, switch is a minimum brightness scale in the second range of brightness scale, and i is a maximum current value of the first driving signal corresponding to the second range of brightness scale.

10. The display device of claim 1, wherein the second driving signal has a constant current value corresponding to the third range of brightness scale.

11. The display device of claim 1, wherein the second driving signal has a constant duty ratio corresponding to the fourth range of brightness scale.

* * * * *